April 21, 1936. C. WAGNER 2,038,068
TRAP FOR ANIMALS AND FOWLS
Filed Sept. 7, 1934
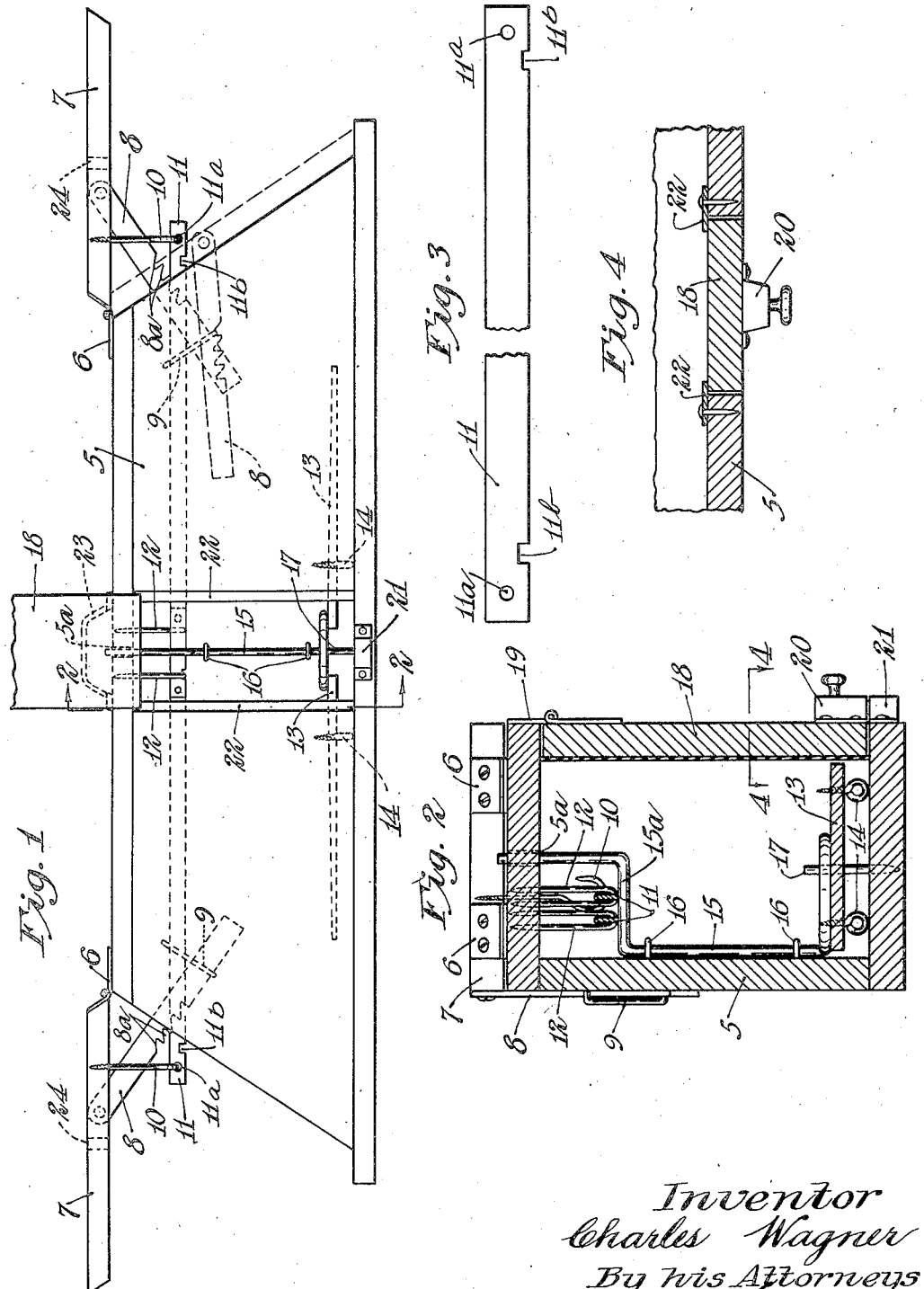
Inventor
Charles Wagner
By his Attorneys
Williamson & Williamson Patented Apr. 21, 1936

2,038,068

UNITED STATES PATENT OFFICE 2,038,068

TRAP FOR ANIMALS AND FOWLS

Charles Wagner, Loretto, Minn.

Application September 7, 1934, Serial No. 743,102

6 Claims. (Cl. 43—61)

This invention relates to traps for animals and fowls.

It is the general object of the invention to provide a novel and improved trap of cheap and simple construction which can be effectively used for catching animals and fowls alive without injuring the same. To this end, generally stated, the invention consists in the novel parts and novel combinations of parts hereinafter defined in the claims and described in the following specification made in connection with the accompanying drawing, wherein like reference characters refer to the same or similar parts throughout the various views, and in which:—

Fig. 1 is a view in side elevation illustrating a trap embodying the invention in set position, the side door of the trap being raised and the right hand door being shown in dash lines as it will appear after the trap has been sprung;

Fig. 2 is a vertical section taken on the line 2—2 of Fig. 1 as indicated by the arrows;

Fig. 3 is a view in enlarged scale of one of the latch bars, and

Fig. 4 is a horizontal section taken on the line 4—4 of Fig. 2 as indicated by the arrows.

In accordance with the invention there is provided a tunnel-like housing 5 of rectangular shape in vertical cross section and having both ends open. The two ends of the housing 5 slope diagonally upwardly and inwardly from the bottom of the housing to the top thereof as shown. Connected by hinges 6 to the ends of the top of the housing 5 are swinging doors 7 which can be raised upwardly to the position shown in Fig. 1 and which are under the influence of gravity to swing downwardly to close the ends of the housing. Latch links 8 are pivotally connected at their outer ends to the doors 7 and these links work through U-shaped keepers 9 attached to one side of the housing 5. The links 8 are provided with a plurality of teeth 8a which are adapted to engage with the keepers 9 after the doors 7 swing closed to prevent the doors from being swung open by animals or fowls caught within the trap unless the inner ends of the links 8 should be raised to disengage the teeth 8a from the keepers 9. A plurality of teeth 8a are provided so that in case the tail or some other portion of the animal caught within the trap should prevent the doors from completely closing the latch links 8 will still be effective for preventing the trapped animal or fowl from opening the particular door in which a portion of its body is caught. It will be understood that the keepers 9 are diagonally set as shown and are quite wide so as to permit freedom for raising and lowering movement of the inner ends of the links 8, the links being freely pivoted to the doors 7 so that their inner ends will drop by gravity to cause engagement between the teeth 8a and the keepers 9.

Connected to the doors 7 at the inner sides thereof are hooks 10. A pair of latch bars 11 is provided and each of these latch bars has an opening 11a at each end for the reception of a hook 10 and each latch bar also has a notch 11b cut in its under edge adjacent each end and preferably the two notches of each latch bar are of different depths. One of the hooks 10 is preferably disposed closer to one side of the housing 5 than the other hook 10 so as to prevent interference between the two latch bars 11. The latch bars are connected adjacent their outer ends to the hooks 10 by engaging the hooks through the outer openings 11a of the latch bars and each latch bar projects inwardly within the casing 5 below the top thereof to a point somewhat beyond the center of the housing. The inner portions of the latch bars are received within staple-like keepers 12 and the lower portions of these keepers when the trap is set are received within the inner notches 11b of the latch bars.

Tread plates 13, to the under sides of which eyes 14 are secured, are disposed within the housing 5 and the eyes 14 form fulcrums resting upon the bottom of the housing about which the tread plates 13 may tilt. Preferably the portions of the tread plates 13 outwardly from the fulcrums 14 are of greater length than the portions of the tread plates inwardly therefrom and the tread plates may be wedge shaped, as shown, having their butt ends inwardly disposed. These tread plates may be conveniently made from ordinary wood shingles if desired.

A trigger 15 has a large loop at its lower end which normally rests upon the two inner ends of the tread plates 13 to overbalance the portions of the tread plates outwardly from the fulcrums 14 and raise these outer portions somewhat above the level of the bottom of the housing. The trigger 15 may consist of merely a rod mounted for vertical sliding movement within guide staples 16 fixed to one side of the housing and this trigger is provided with a shoulder 15a which underlies the inner portions of the two latch bars 11. From the shoulder 15a the trigger runs upwardly through an opening 5a in the top of the housing and the trigger is thus prevented from swinging movement. Attached to the central part of the floor of the housing 5 is a pin 17 to separate the inner ends of the tread plates. This pin preferably projects upwardly through the loop of the trigger 15 between the inner ends of the two tread plates 13.

To permit removal of a trapped animal or fowl from the trap as well as to permit access to the central part of the trap there is provided an opening in one side of the housing 5 normally closed by a door 18 secured by a hinge 19 to one edge of the top of the housing. This door 18 carries near its normally lower edge a latch 20 which can be engaged with a keeper 21 attached to one edge of the bottom of the housing. To prevent animals caught within the trap from gnawing their way out between the door 18 and the adjacent portions of the sides of the housing 5 within which the door is normally received, strips of metal 22 are attached to this side of the housing to overlie portions of the side edges of the door 18 when the door is closed.

To set the trap it is merely necessary to release the teeth 8a of the links 8 from the keepers 9 by raising the inner ends of the links 8 and to thereupon raise the doors 7 so as to cause the inner notches 11b of the latch bars 11 to have engagement with the keepers 12. Bait will preferably be sprinkled on the tread plates over the fulcrums 14 thereof, or if desired, bait may be hung from the central part of the top of housing 5. Of course, the door 18 will be closed and latched. As both doors 7 will be open when the trap is set, an animal or fowl can see clear through the housing 5 and will feel secure in entering the housing 5. To gain access to the bait, the animal or fowl must step on the outer portion of one of the tread plates 13 and the weight of the animal will be sufficient to overbalance the weight of the inner portion of the tread plate and the trigger 15 resting thereon and as a result the trigger 15 will be raised causing the shoulder 15a to kick up the inner portions of the two latch bars 11 to disengage the keepers 12 from the inner notches 11b. The two doors 7 will then be free to swing downwardly to closed position and this they will rapidly do to close the open ends of the housing 5. As the two doors 7 swing downwardly by gravity, one tooth 8a of each of the latch links 8 will engage with the keeper 9 for that particular link so as to prevent the door 7 from being opened by the animal or fowl. The animal or fowl will then be securely trapped without being injured in any respect. To release the animal from the trap it is merely necessary to unlatch the latch 20 and raise the door 18 whereupon access may be had to the animal.

Each latch bar 11 is provided with two hook openings 11a and two notches 11b of different depths so as to permit the ends of the latch bars to be reversed to cause either the deep notch 11b or the shallow notch 11b of that bar to be engaged with its keeper 12. The sensitivity of the trap may accordingly be adjusted. By varying the positions of the fulcrums 14 longitudinally of the tread plates 13 the sensitivity of the trap may also be adjusted. In other words, when the trap is to be used for catching light weight animals or fowls, it is desirable to cause the trap to be sprung easier than in the case of when the trap is to be used for heavier animals or fowls. By moving the fulcrums 14 toward the inner or butt ends of the tread plates 13 the sensitivity of the trap may be increased, inasmuch as the portions of the tread plates outwardly of the fulcrums will more nearly counterbalance the weight of the inner portions of the tread plates plus the weight of the trigger 15. Conversely, by moving the fulcrums 15 outwardly toward the outer ends of the tread plates the sensitivity of the trap may be decreased.

It will be seen that an extremely simple and efficient trap has been provided. In actual usage the trap has been found effective for catching many different kinds of small animals and fowls.

Preferably, a handle 23 is attached to the top of the housing 5 to permit the trap to be readily carried.

It will, of course, be understood that various changes may be made in the form, details, arrangement and proportions of the various parts without departing from the scope of the present invention.

If desired, peek openings 24 may be provided in the doors 7 through which a trapped animal or fowl may be observed. Also when it is desired to remove a trapped animal or fowl from one end of the housing 5 by opening one of the doors 7, a rod may be pushed through the opening 24 in the other door 7 to force the animal or fowl out of the trap.

What is claimed is:—

1. A trap for animals and fowls comprising a housing having an open end, a door hinged to said open end and swingable downwardly by gravity from an open position to close said end, a fulcrumed tread plate within said housing, a shouldered trigger normally resting at one end against one end of said tread plate to hold the other end of the tread plate raised, a keeper mounted within the upper part of said housing and a bar pivotally connected at its outer end to said door and having adjacent its inner end a notched portion at its under edge engageable with said keeper, the shoulder of said trigger underlying the inner portion of said bar whereby when said door is opened said trap may be set and upon an animal or fowl stepping on said tread plate the trap will be sprung.

2. A trap for animals and fowls comprising a housing having an open end, a door hinged to said open end and swingable downwardly by gravity from an open position to close said end, a tread plate within said housing fulcrumed for swinging movement, a shouldered trigger normally resting at one end against the inner end of said tread plate to hold the outer end of the tread plate raised, a keeper within the upper part of said housing, a hook connected to said door and a latch bar pivotally connected at its outer end to said hook and having its inner end working through said keeper above the shoulder of said trigger, said latch bar having a notch adjacent its inner end within which a portion of said keeper is normally received whereby when the trap is set an animal or fowl stepping upon the outer end of said tread plate will lift said trigger to raise the inner portion of said latch bar and release said door.

3. A trap for animals and fowls comprising a housing having oppositely opposed open ends, doors hinged respectively to said open ends and swingable downwardly by gravity from an opened position to close said ends, a pair of tread plates fulcrumed within said housing, a shouldered trigger guided for upward and downward movement and normally resting at its lower end against the inner ends of said tread plates to hold the other ends of said tread plates raised, keepers mounted within the upper part of said housing at the central portion thereof and latch bars pivotally connected at their outer ends to said doors and running inwardly through said keepers to points above the shoulder of said trigger, said latch bars having notches at their under surfaces adjacent their inner ends within which the respective keepers are engaged whereby when said doors are open the trap may be set and upon an animal or fowl stepping on either tread plate the trap will be sprung.

4. The structure defined in claim 3, the lower end of said trigger resting on said tread plates being a loop and a member attached to the bottom of said housing and projecting upwardly through said loop to assist in spacing the inner ends of said tread plates.

5. A trap for animals and fowls comprising a housing having an open end, a door mounted at said open end for movement under the action of gravity downwardly from an open position to a closed position to close said end, a tread plate within said housing and having a portion normally bearing against said housing and another portion normally raised from the bottom of the housing when the trap is set, a shouldered trigger normally engaged with the raised portion of said tread plate to maintain the same raised, a keeper mounted within the upper part of said housing, and a bar pivotally connected at its outer end to said door and having adjacent its inner end a notched portion at its under edge engageable with said keeper, the shoulder of said trigger underlying the inner portion of said bar whereby when said door is opened said trap may be set and upon an animal or fowl stepping on said tread plate the trap will be sprung.

6. A trap for animals and fowls comprising a housing having an open end, a door mounted at said open end for movement under the action of gravity downwardly from an open position to a closed position to close said end, a fulcrumed tread plate within said housing, a shouldered trigger normally resting at one end against one end of said tread plate to hold the other end of the tread plate raised, a keeper mounted within the upper part of said housing, and a bar pivotally connected at its outer end to said door and having adjacent its inner end a notched portion at its under edge engageable with said keeper, the shoulder of said trigger underlying the inner portion of said bar whereby when said door is opened said trap may be set and upon an animal or fowl stepping on said tread plate the trap will be sprung.

CHARLES WAGNER.